United States Patent
Czekajewski et al.

[11] 4,337,726
[45] Jul. 6, 1982

[54] ANIMAL ACTIVITY MONITOR AND BEHAVIOR PROCESSOR

[76] Inventors: Jan A. Czekajewski, 4348 Shire Cove, Columbus, Ohio 43220; Harold L. Hill, 425 Rhoads Ave., Columbus, Ohio 43205; Kenneth J. Kober, 595 S. James Rd., Columbus, Ohio 43213

[21] Appl. No.: 166,306

[22] Filed: Jul. 7, 1980

[51] Int. Cl.³ .............................................. A01K 45/00
[52] U.S. Cl. ......................................... 119/1; 119/29; 128/782
[58] Field of Search .............. 128/782; 73/172; 119/1, 119/29; 340/541–567

[56] References Cited
U.S. PATENT DOCUMENTS

| | | | |
|---|---|---|---|
| 3,304,911 | 2/1967 | Hakata et al. | 119/1 |
| 3,439,358 | 4/1969 | Salmons | 128/782 X |
| 3,803,571 | 4/1974 | Luz | 119/1 |
| 3,974,798 | 8/1976 | Meetze | 119/1 |

FOREIGN PATENT DOCUMENTS 2149090  4/1973  Fed. Rep. of Germany ...... 128/782

OTHER PUBLICATIONS

Smit, Huz et al., "A Capacitive Method of Measuring Circadian Activity in Lab Animals", Med. & Biol. Engrg., Nov. 1974, pp. 831–835.

*Primary Examiner*—Kyle L. Howell
*Assistant Examiner*—Francis J. Jaworski

[57] ABSTRACT

An animal activity monitor and behavior processor for collecting data from an animal being tested in an observation area. The apparatus is adapted to separate animal activity data into two groups by differentiating ambulatory or relocation movements from non-ambulatory movements such as grooming, scratching or body rotation.

20 Claims, 10 Drawing Figures

ANIMAL ACTIVITY MONITOR AND BEHAVIOR PROCESSOR

BACKGROUND OF THE INVENTION

This invention relates generally to animal activity monitors and more particularly to novel apparatus of this type which are uniquely adapted to differentiate between ambulatory and non-ambulatory movements of the test specimen.

PROBLEMS IN THE ART

Various types of animal activity monitors have been known in the art and used by behavioral analysts in the study of the effects induced upon animals by drugs, surgery or other alterations of the test specimens. Although such prior activity monitors have included the capacity to generally detect and record the general activity of specimens, a problem has been present in that data obtained has been devoid of any means of differentiation between the specimen's ambulatory and non-ambulatory activities. It was recognized, however, by behavioral analysts that such heretofore unobtainable data on the differentiation between the two types of animal activity is most important in the making of comparative studies because the ratio between the indices of the two types of activities changes when the animal is subjected to test alterations.

SUMMARY OF THE INVENTION

In general, the animal activity monitor of the present invention comprises methods and apparatus for containing the animal specimen to be tested within an observation area. Activity detecting means, such as a plurality of spaced beams of radiation are projected across the observation area so as to be interrupted by the animal as it moves within the area.

The monitor further comprises means for producing signals responsive to all such beam interruptions, including those made by ambulatory (relocation) movements of the animal as well as non-ambulatory movements (scratching, grooming, and the like). In accordance with the present invention the method and apparatus uniquely comprises novel signal processing means for automatically discriminating between those signals produced by ambulatory movements and those signals produced by non-ambulatory movements. These two types of movements are each separately counted so as to make available the above mentioned ratio of indices of activity.

In accordance with one embodiment of the present invention, the animal being tested, is circumscribed by a boundary defined by the above mentioned beams which defines an area which area can be adjusted in size by the operator. If the animal displaces beyond the selected boundary, then displacement signals are produced and accumulated by an ambulatory activity counter. Moreover, when a displacement movement of the animal occurs and terminates the boundary and area are automatically moved to an appropriate new location, wherein the animal is again circumscribed by the newly positioned boundary. Any activity of the animal occurring within the boundary produces non-ambulatory signals which are accumulated separately and counted on a second separate non-ambulatory activity meter.

In accordance with another embodiment of the present invention the previously mentioned spaced beams of radiation produce a uniform beam field throughout the observation area.

When the animal displaces itself across a plurality of beams, the beams are broken and produce signals which are accumulated on an ambulatory activity counter. When any one of the plurality of beams is broken, then memorization circuitry recognizes the particular broken beam and isolates the signal from such beam from the ambulatory activity counter until the animal breaks a different beam. When this occurs the first broken beam is reassociated with the ambulatory activity counter. Upon the occurance of successive breaking and recompleting of a single beam, caused by scratching, grooming, or other non-ambulatory movements, the signals produced are accumulated on a separate non-ambulatory activity counter. It is by this means that differentiation of the two types of activity is accomplished.

It is therefore a primary object of the present invention to provide novel animal activity monitoring apparatus and method that are uniquely adapted to separate animal activity data into two groups by differentiating ambulatory movements of the animal from those movements which are non-ambulatory.

It is another object of the present invention to provide novel apparatus and method of the type described that uniquely utilizes a boundary established by spaced beams and associated electronic apparatus.

The size of the area defined by the boundary is adjustable by the operator to select the threshold between two types of activities, and the location of the boundary on the test area is automatically repositioned, so as to reestablish circumscription of the animal as it moves about in the observation area.

It is still another object of the present invention to provide novel apparatus and method of the type described that uniquely employs a uniform field of spaced beams and associated electronic apparatus wherein electronic memorization is utilized to differentiate between ambulatory and non-ambulatory activities of the test specimen.

Further objects and advantages of the present invention well be apparent from the following description, reference being had to the accompanying drawings wherein preferred forms of the embodiments of the invention are clearly shown.

DESCRIPTION OF THE FIRST EMBODIMENT

Referring in detail to the drawings an animal activity monitor constructed in accordance with one embodiment of the present invention is illustrated in FIGS. 1-4, 6, 7, and 7-A. In general, this first embodiment utilizes an electronically controlled "boundary" that circumscribes the animal and establishes a threshold between its ambulatory and non-ambulatory movements. Such a boundary is automatically moved about in the observation area so as to track the animal and circumscribe its body each time the animal moves to a new position in the observation area. The boundary is provided by a grill of spaced beams of radiation together with appropriate electronic circuitry shown in FIGS. 6, 7 and 7-A.

Figure 1:
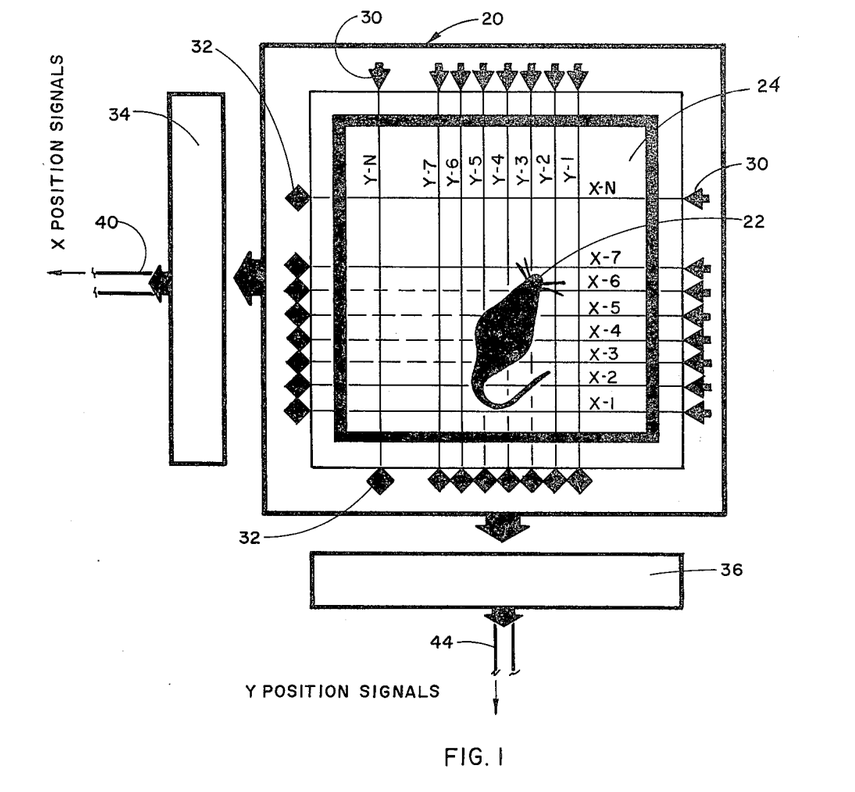
FIG. 1 is a top elevational view of an observation area provided with spaced beams of radiation that comprises a portion of the animal activity monitor of the present invention.
Figure 2:
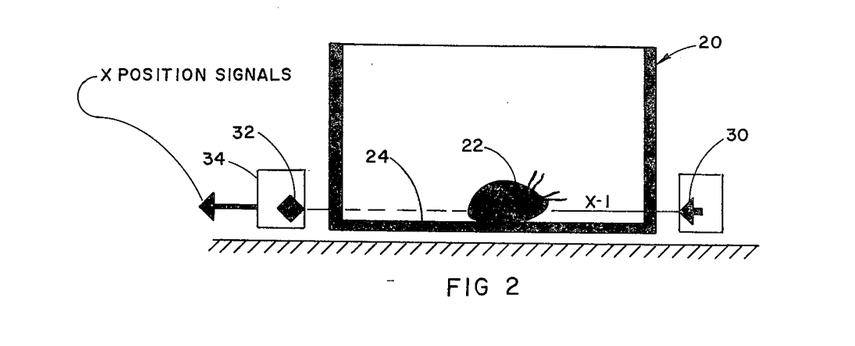
FIG. 2 is a side elevation view corresponding to FIG. 1.

Referring particularly to FIGS. 1 and 2, the monitor comprises a cage indicated generally at 20, that serves to confine an animal test specimen 22 to an observation area 24.

Obervation area 24 is traversed by a plurality of spaced beams of radiation, such as light beams. Those of the beams, which extend horizontally as viewed in FIG. 1, will be referred to as X-beams with the vertically extending beams being designated as Y-beams.

As seen in FIG. 1, each of the beams includes an emitter 30 and a receiver 32 with the receivers of the X-beams being connected to an X-position to voltage converter 34 that produces X-position analog signals. The receivers 32 of the Y-beams are in turn connected to a Y-position to voltage converter 36 that produces Y-position analog signals.

Figure 6:
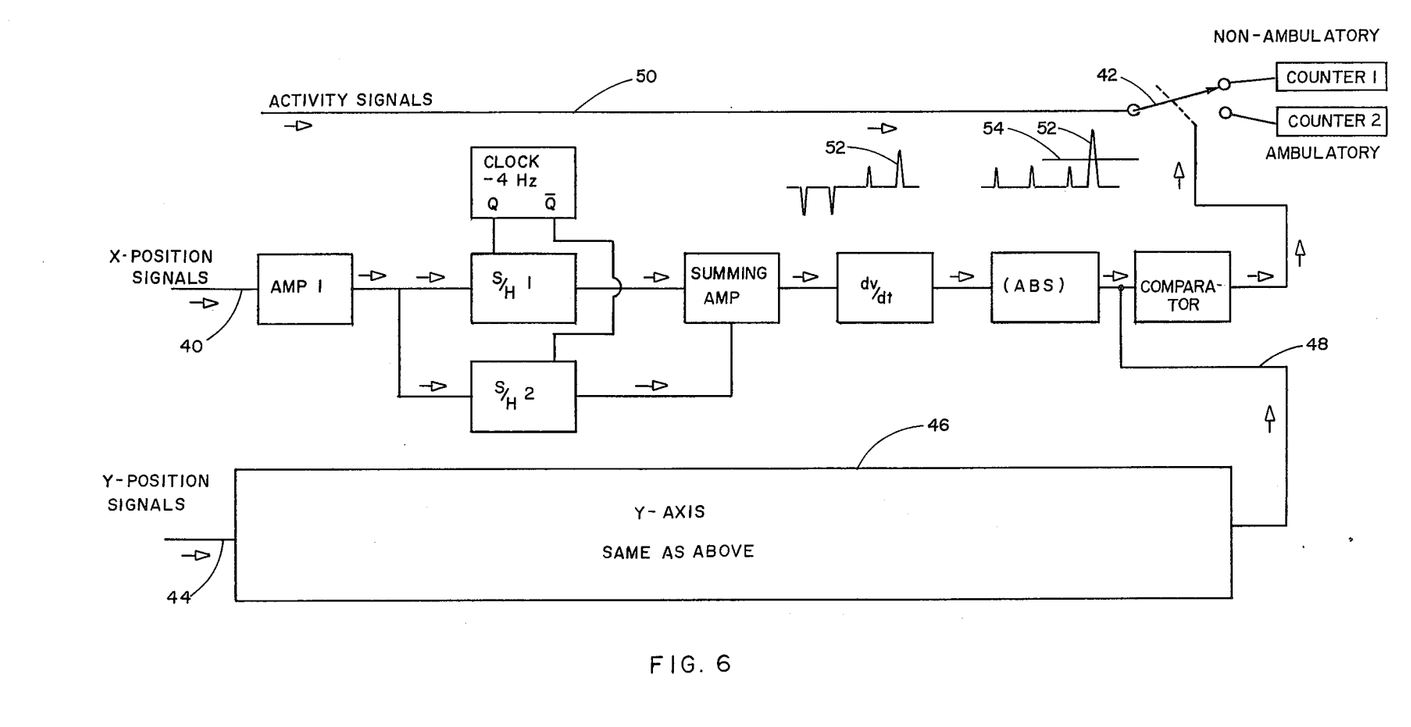
FIG. 6 is a block diagram of an electric circuit comprising a portion of said first embodiment of FIGS. 3 and 4.

Reference is next made to FIG. 6 which comprises a block diagram of th circuit of the first embodiment. The X-position analog signals from the X-position to voltage converter 34 of FIG. 1 are fed via wire 40 to an amplifier indicated at Amp 1, where the signals are amplified, for example by a factor of two. The output from Amp 1 is fed to two sample and hold circuits s/h 1 and s/h 2 which are alternatively selected by a clock having a suitable frequency such as 4 hz.

The X-position signals from the two sample and hold circuits s/h 1 and s/h 2 are fed to a summing amplifier which in turn produces an output voltage signal that is updated eight times a second, so as to track the X-position signals.

The output signals from the summing Amp are fed to a differentiator dv/dt that produces voltage spikes that are proportioned in amplitude to the step changes from the summing amp. Because these spikes can be both positive and negative, an absolute value circuit ABS is used to produce all spikes as positive signals.

It will now be understood that the amplitudes of the spikes are proportioned to the position of the animal specimen in the observation area.

With continued reference to FIG. 6, signals from the ABS are next fed to a comparator which functions to establish the X-portion of the previously mentioned boundary which circumscribes the animal and establishes a threshold between non-ambulatory and ambulatory movements of the animal specimen. The comparator includes an operator adjustable trigger level and when the amplitude of one of the above mentioned spikes exceeds a preset value, or threshold, as amplified by spike 52 and trigger level 54, then a switch 42 is actuated to switch the incoming activity signals from a non-ambulatory counter to an ambulatory counter.

Referring to FIGS. 1, 2, and 6, the position signals from the Y-position to voltage decoder 36 are delivered via wire 44 to a Y-axis circuit indicated generally at 46 which is identical to the X-axis circuit described above.

It should be mentioned that both the X-axis circuit and the Y-axis circuit deliver their processed signals to the same timer selector switch 42 via a common wire 48.

Also it should be mentioned that the Y-axis circuit functions to establish the Y-portions of the above described boundary or threshold between non-ambulatory and ambulatory movements.

Figure 4:
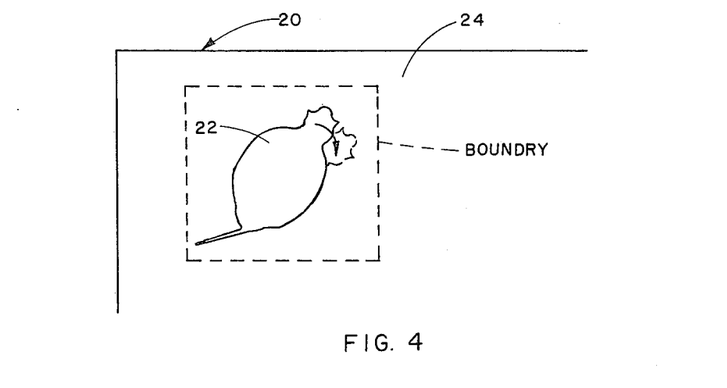
FIG. 4 is a second diagrammatic view of the observation area and boundary of FIG. 3 with the test specimen shown engaged in non-ambulatory activity.

With reference to FIG. 6, it should be pointed out, that activity signals are produced by the X and Y-beams of radiation each time a beam is broken by the animal specimen and all of such activity signals are fed directly to the non-ambulatory counter, so long as the animal remains within the boundary, as illustrated in the diagram of FIG. 4. In this diagram the animal is represented as moving its head and such non-ambulatory movement would merely produce activity signals which are fed directly to the non-ambulatory counter via wire 50 and switch 42.

Figure 3:
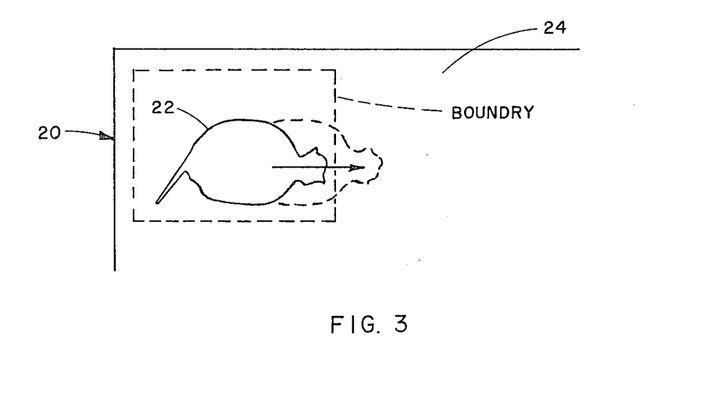
FIG. 3 is a diagrammatic view of a portion of an observation area, test specimen, and associated boundary arranged in accordance with a first embodiment of the present invention. The test specimen is shown engaged in an ambulatory movement beyond the boundary.

When the animal specimen displaces beyond the boundary, as shown in the diagram of FIG. 3, then the analog voltage signals from decoder 34 or 36 produce a voltage spike 52, having an amplitude that exceeds the trigger level 54 of the comparator, as previously described. This activates switch 42, so as to connect the incoming activity signals to the ambulatory counter.

Figure 7:
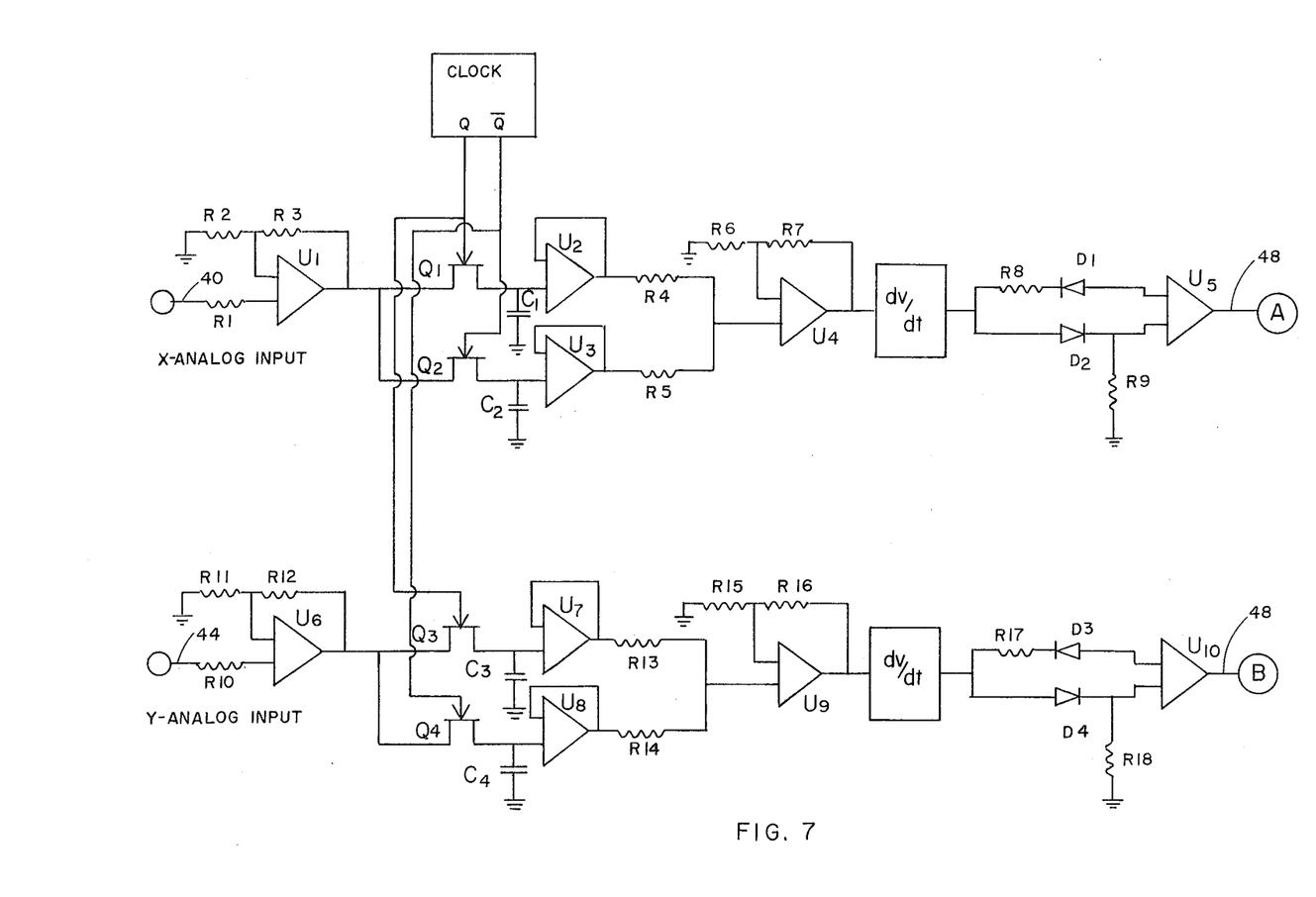
FIGS. 7 and 7-A show the schematic circuit for the first embodiment which corresponds to the block diagram of FIG. 6.
Figure 7A:
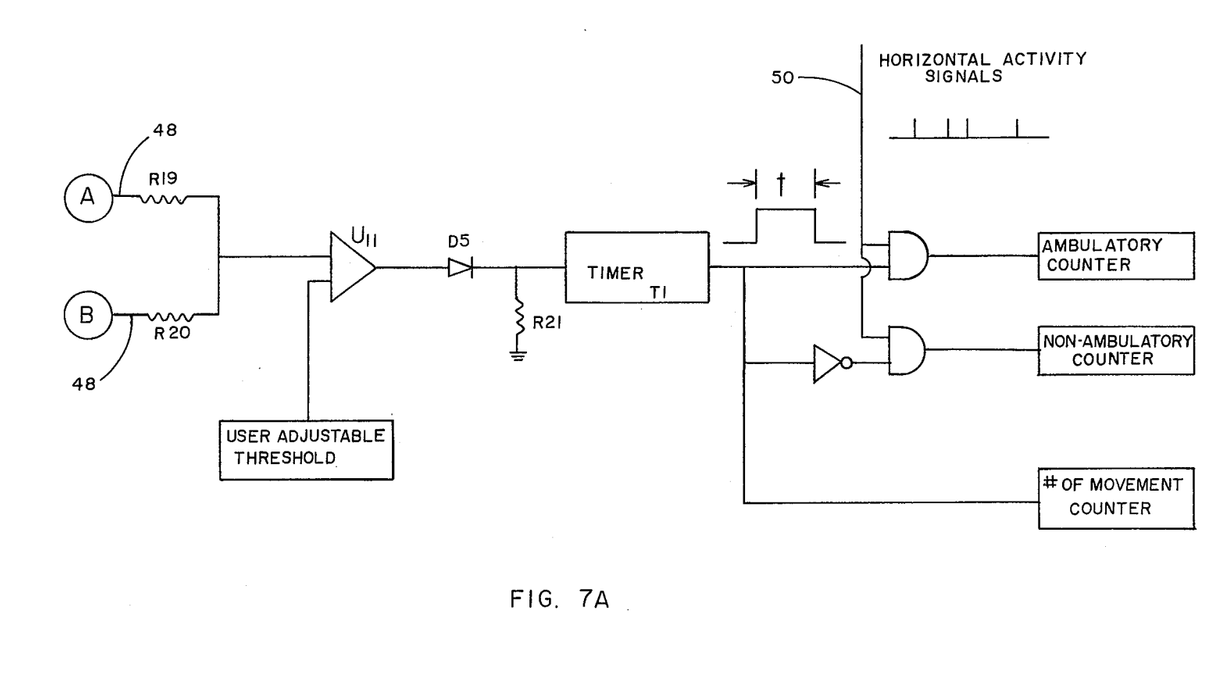

Reference is next made to FIGS. 7 and 7A which illustrate a schematic or specific circuit diagram of the first embodiment that corresponds to the block diagram of FIG. 6 as described. As described above, movements of the animal specimen in the observation area produces the two analog voltage signals X and Y which represent the animal's position. These analog signals are fed from the decoders 34 and 36 via the wires 40 and 44, as seen in FIGS. 1 and 7.

Referring to the upper branch of the circuit portion of FIG. 7, the X-signals are fed to amplifier U1 which includes resistors R1, R2, and R3. The signals are next gated by two FET's Q1 and Q2 which in turn feed two analog memory circuits U2 and U3, with the two FET's being alternatively selected by two timed outputs Q and $\bar{Q}$ from the clock. This action produces a step change in voltage at the junction of the R4 and R5 resistors which is a function of the change in position of the animal specimen.

It will be noted that analog memory circuits U2 and U3 respectively include the capacitors C1 and C2.

The signals then proceed to amplifier U4 that includes resistors R6 and R7 and that amplifies the step changes that in turn drive the differentiation circuit dv/dt.

The output signals from the dv/dt circuit is in the form of voltage spikes, the amplitudes of which vary proportioned to the change and direction of the animal's movements. Since these changes in animal position can produce both positive and negative voltage spikes, an absolute value circuit is provided to rectify the sign changes in the form of R8, D1, D2, R9 and U5. such an absolute value circuit is seen at ABS in the block diagram of FIG. 6. Hence all the spikes appear as positive signals notwithstanding the output from the differentiation circuit dv/dt.

The X-analog signals are combined with Y-analog signals from an identical circuit shown in the lower branch of the circuit portion of FIG. 7. It will be noted that the X and Y-signals are brought together at the resistors R19 and R20 and common wire 48 seen in the two circuit portions of FIGS. 7 and 7A.

Figure 5:
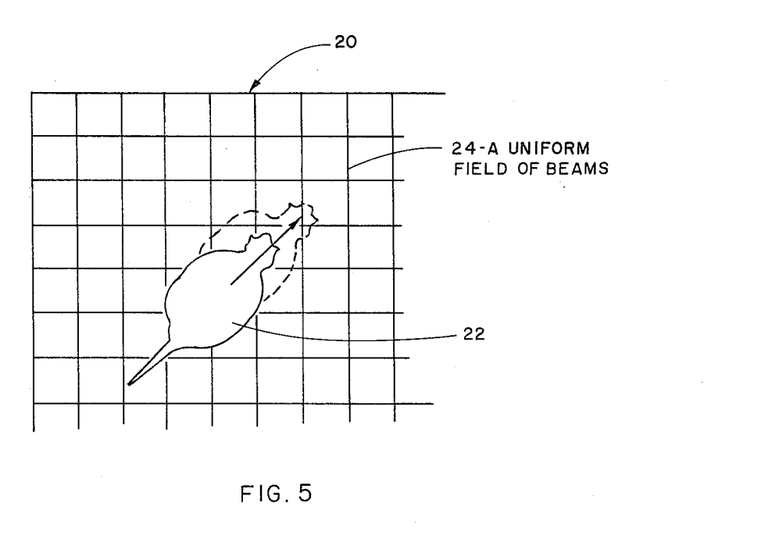
FIG. 5 is a diagrammatic view of an observation area, spaced beams of radiation, and a test specimen arranged in accordance with a second embodiment of the present invention.

Referring particularly to FIG. 7A, the previously mentioned comparator circuit FIG. 6, specifically consists of U11, which includes an operator adjustable threshold, D5, R21 and timer T1. It should be mentioned that the user adjustable threshold is used to vary the area delineated by the previously described electronic boundary that circumscribes the animal specimen, as seen in FIGS. 4 and 5.

With continued reference to FIG. 7A, if a displacement of the animal exceeds a pre-set level of the user-adjustable threshold, which occurs when the animal crosses the boundary, FIG. 3, the U11 produces a signal having an amplitude that exceeds the preset level and therefore triggers timer T1 through D5 and R21.

When the timer T1 fires it directs the horizontal activity pulses from wire 50 to the ambulatory activity counter for a period of t.

The timer will continue to so direct the signals to the ambulatory counter so long as it is retriggered during the timer period t, such as occurs responsive to large animal displacements When displacement of the animal specimen ceases, with a time lapse in excess of period t, then timer T1 resets and channels the horizontal activity signals to the non-ambulatory counter.

It will now be understood that for each firing of the timer T1 one animal displacement has occured, with these displacements being accumulated by a "number of movements" counter shown in FIG. 7A.

Referring again to FIG. 7, the lower branch of this circuit portion, which is identical to the upper branch, includes the amplifier components U6, R10, R11, and R12. These are gated by the FET's Q3 and Q4 which in turn feed two analog memory circuits U7 and U8 that include capacitors C3 and C4. The resulting voltage is step changed at R13 and R14 in proportion to the animal's position. The step changes are amplified at U9, R15 and R16 and then fed to the differentiation circuit dv/dt. The sign of the negative signals are next changed at the absolute value circuit which comprises R17, D3, D4, R18, and U10. Thereafter the Y-signals are added via R20 to the X-signals from the identical circuit in the upper branch.

Figure 8:
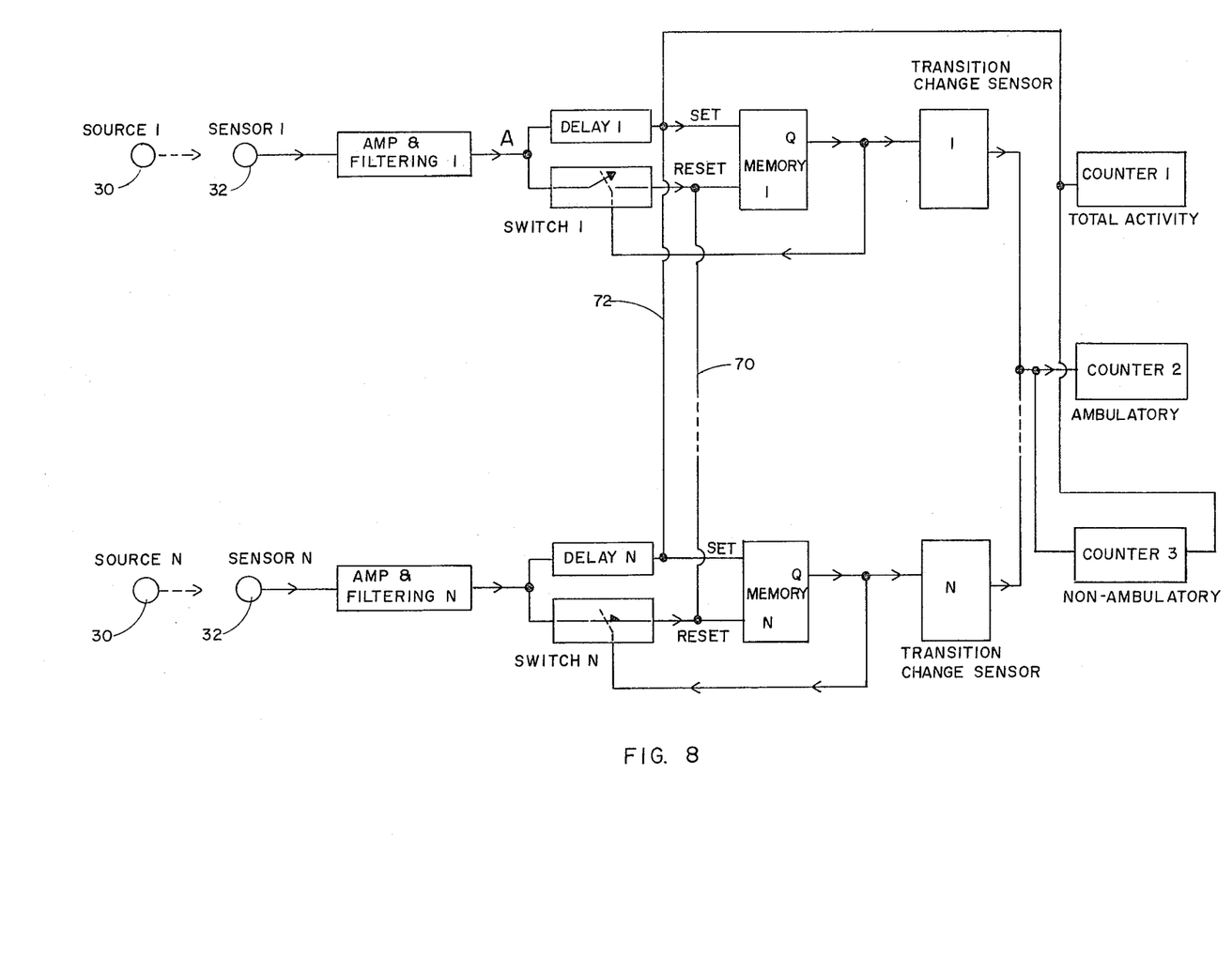
FIG. 8 is a block diagram of an electric circuit comprising a portion of said second embodiment of the present invention, shown in FIG. 5.

Reference is next made to FIG. 8 which shows a block diagram of the circuit for the second embodiment. Each of the beams X-1 thru X-N and each of the beams Y-1 thru Y-N terminates at a sensor indicated at 32 in FIG. 1.

Each uninterrupted beam produces a signal which, after amplification and filtering in the Amp and Filtering circuit portion, produces a logic 0 at point A on the diagram.

When a beam is interrupted by animal movement, point A changes logic to a 1.

The signal leaving point A travels two paths. One path is through a switch 1 to Reset inputs of all the memory channels for all of the beams. The other path carries the signal through a delay circuit Delay 1 which makes it lag the signal in the first path through switch 1.

When the lagging signal leaves Delay 1, it is fed to the Set input of only Memory 1, ie only the memory in the channel for the particular beam.

DESCRIPTION OF THE SECOND EMBODIMENT

In general this embodiment of the present invention consists of an animal activity monitor that includes an observation area traversed by a plurality of spaced beams of radiation, so as to form a field of uniform beams. Each time a beam is broken by a movement of an animal, a voltage signal is produced. These signals are accumulated by digital counters. When any one of the beams is broken memorization circuitry recognizes the particular beam and isolates subsequent signals from such beam from an ambulatory activity counter until the animal breaks another beam. When such different beam is broken, the first broken beam is reassociated with the ambulatory activity counter. A separate counter referred to herein as a total activity counter accumulates all signals produced, and a third counter referred to as a non-ambulatory counter records the difference between the total activity counter and the ambulatory counter.

Reference is next made to FIG. 8, which shows a block diagram of the circuit for the second embodiment. Each of the beams X-1 thru X-N and each of the beams Y-1 thru Y-N of FIG. 1 are programmed for this second embodiment as uniform beams that are each pulsed at high frequency. Each of the beams terminates at a sensor indicated at 32 in FIGS. 1 and 8.

Each uninterrupted beam produces a signal which, after amplification and filtering in the Amp and Filtering circuit portion, produces a logic 0 at point A on the diagram. When a beam is interrupted by animal movement, point A changes logic to a 1.

The signal leaving point A travels two paths. One path is through a Switch 1 to Reset inputs of a memory segment Memory 1, as well as all the other memory segments 2 through N for all of the other beams.

The other path carries the signal leaving point A through a delay circuit Delay 1 which makes it lag the signal in the first path through Switch 1.

When the lagging signal leaves Delay 1, it is fed to the Set input of only Memory 1, ie only the memory segment in the channel for the particular beam.

When the memory 1 receives the signal on its Set input, it produces a high output signal at a memory output Q. Such high output in turn travels to a Transition Change Sensor 1 that indexes Counter 2 that accumulates ambulatory movements.

It should be pointed out that each time a signal leaves Delay 1, it is accumulated at counter 1, as a total activity signal via line 72, which is common to all the channels. Counter 3 records the difference between counter 1 and counter 2 as non-ambulatory movements.

The high output signal from Q of Memory 1 is also fed back to switch 1 in the Reset input line of the Memory 1 cicuit This opens Switch 1, thereby preventing any further signals from sensor 1 from passing to the Reset of Memory 1.

It will now be understood that due to the common connection of all of the memory circuits via line 70, it is only possible to reset a previously interrupted beams's memory by first interrupting another one of the beams.

The foregoing description is directed to a beam 1, sensor 1, and the associated memory circuit for the beam. It will be understood that the description also applies to each of the identical memory channels for the other beams. For reasons of simplifying the description, the block diagram of FIG. 8 illustrates only two of the memory channels for two of the beams.

Figure 9:
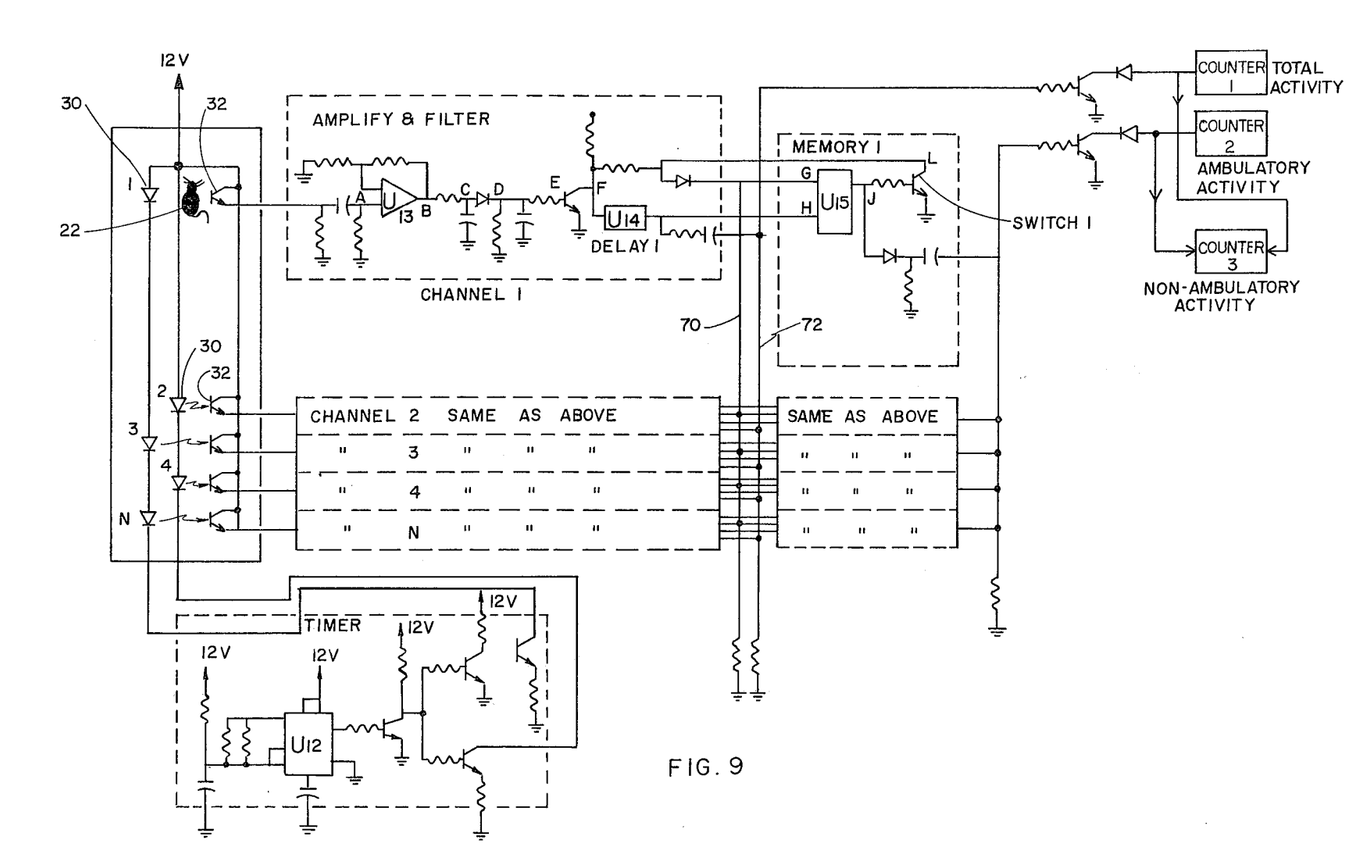
FIG. 9 is a schematic circuit for the second embodiment which corresponds to the block diagram of FIG. 8.

Reference is next made to FIG. 9 which illustrates a schematic or specific circuit for the second embodiment of the present invention. This schematic view of FIG. 9 corresponds to the block diagram of FIG. 8 just described.

This embodiment comprises an observation area 24 that is traversed by a uniform field of spaced beams of radiation, as is represented by the beams shown in the observation area 24-A of FIG. 5. In this diagram an animal specimen 22 is represented by the dotted delineation as undergoing a displacement that interrupts beams of the field.

With reference to FIGS. 1 and 9, each of the emitters 30 for each of the beams is pulsed on and off at high frequency, as established by a timer U-12. Each of said beams terminates at a sensor 30 that perceives the rapid pulse of the source.

Referring specifically to Channel 1 in FIG. 9, the pulsed signals are amplified in an Amplify and Filter section by an amplifier U-13. The filter network is provided at points B-E. This produces an 0 level logic signal at point F.

With continued reference to FIG. 9, when the beam associated with channel 1 is interrupted, a switch E opens and the voltage at point F changes from 0 to 12 to provide logic 1 signal that travels along two paths. The first path along line G is the faster of the two and is delivered to a "reset" R of memory segment U-15 as well as to all the other memory segments for all of the channels 2 through N. It will be noted that a common line 70 connects all of the memory segments for all of the channels.

The second path from F carries the signal through a delay circuit U-14 and thence to the set input S of only the memory segment U-15 associated with the particular beam of channel 1.

When the set input S of memory segment U-15 receives the logic 1 signal, the segment responds by producing a logic 1 signal at its output Q, which is delivered to point J. This serves to index Counter 2 and an ambulatory movement is recorded, and also turns on a transistor switch 1 that pulls point L to the ground.

This prevents any signals subsequently generated at point F from reaching the resets R of memory segments U-15, as well as the resets of any of the other memory segments due to the common line 70.

It will now be understood, that as a result of this signal blocking process, the apparatus and method of this second embodiment isolates repetitious interruption of a single beam from repetition indexing of Counter 2, whereby only ambulatory movements are accumulated. In order to index Counter 2, another beam must be interrupted. It should be noted, that since all reset inputs R of all of the memory segments are connected together, a memory segment, that has been set, can be reset.

In view of the above, it will be understood, that Counter 1 records all signals at the set inputs S of all the memory segments and hence functions to accumulate all of the movements of the animal specimen as total activity.

Counter 3 accumulates the difference between Counter 1 and Counter 2 and hence functions to accumulate non-ambulatory movements.

We claim:

1. An animal activity monitor and behavior processor comprising, in combination, means forming an observation area for containing an animal specimen; a plurality of spaced beams of radiation projected across said observation area, so as to be interrupted by the animal, as it moves within said area; a total activity counter for automatically recording each interruption of any of the plurality of beams; and an ambulatory counter that automatically records only the first interruption of any one of the plurality of beams until such one beam is reactivated by an interruption of another of the plurality of beams.

2. An animal activity monitor and behavior processor comprising, in combination, means forming an observation area for containing an animal specimen; a plurality of spaced X-beams of radiation projected across said observation area in the direction of a first axis; a second plurality of spaced Y-beams of radiation projected across said observation area in the direction of a second axis; means for analyzing signals produced by interruption of said X-beams for determining animal position with respect to one of said axes, means for analyzing signals produced by interruption of said Y-beams for determining animal position with respect to the other of said axes; means responsive to said signals for delineating a preselected boundary between non-ambulatory and ambulatory animal movement; an ambulatory activity meter for automatically accumulating signals produced by displacement of the animal beyond said preselected boundary; and a non-ambulatory activity meter for automatically accumulating signals produced by an animal activity within said preselected boundary.

3. In an animal activity monitor that comprises an observation area and a plurality of spaced beams of radiation that traverse the area, the combination of a position to voltage decoder for producing analog voltage signals responsive to breaking of the beams by the animal which signals vary in magnitude responsive to the displacement of the animal in the area; differentiation means for detecting the magnitude of said analog voltage signals when said signals reach a predetermined threshold level; horizontal activity signal producing means for producing voltage signals responsive to breaking of said beams by the animal; non-ambulatory counter for automatically accumulating the horizontal activity signals; an ambulatory counter for automatically accumulating the horizontal activity signals; and switch means responsive to said differentiation means for switching the delivery of horizontal activity signals from one of said counters to the other when the magnitude of the analog voltage signals reaches said predetermined threshold level.

4. The monitor defined in claim 3 that includes a user adjustable control for varying the magnitude of said preselected threshold.

5. The monitor defined in claim 3 wherein the analog voltage signals are both positive and negative; and means for rectifying the signals.

6. The monitor defined in claim 3 wherein said switch means includes a timer having a period t that establishes a time interval for the automatic reswitching between the counters responsive to the non-occurence of animal displacement during said time interval.

7. The monitor defined in claim 3 that includes means responsive to the magnitude of the analog voltage signals exceeding said preselected threshold for establishing an electronic boundary that circumscribes the animal specimen.

8. The monitor defined in claim 7 that includes means for automatically repositioning said boundary, so as to successively reestablish circumscription of the animal specimen.

9. An animal activity monitor and behavior processor comprising, in combination, means forming an observation area for containing an animal specimen; a plurality of spaced beams of radiation projected across said observation area, so as to be interrupted by the animal, as it moves within said area; a first signal producing means for a first one of said beams for producing first channel voltage signals responsive to interruptions of said first beam; a first circuit channel for processing said first channel voltage signals; a first memory segment Memory 1 in said first circuit channel and including a reset input R-1, a set input S-1, and an output Q-1; a first transition change sensing means including an input connected to Q-1 and an output; a second signal producing means for a second one of said beams for producing second channel voltage signals responsive to interruptions of said second beam; a second circuit channel for processing said second channel voltage signals; a second memory segment Memory 2 in said second circuit channel and including a reset input R-2, a set input S-2, and an output Q-2; a second transition change sensing means including an input connected to Q-2 and an output; a conductor connecting the two reset inputs R-1 and R-2 of the first and second memory segments; a total activity counter for receiving and automatically counting voltage signals fed to the set inputs S-1 and S-2 of said first and second memory segments and an ambulatory activity counter for receiving and automatically counting voltage signals from the outputs of the first and second transition change sensing means.

10. The steps in the method of monitoring the activity and behavior of an animal specimen, which method comprises containing said specimen in an observation area; automatically detecting ambulatory relocation movements of the specimen within said area; automatically detecting non-ambulatory movements of the specimen within said area; and automatically accumulating counts of each of the two types of movement.

11. The steps in the method of monitoring the activity and behavior of an animal specimen, which method comprises containing said specimen in an observation area; projecting a plurality of spaced beams of radiation across the observation area such that the beams are interrupted by activity of the specimen; monitoring total animal activity by automatically counting and recording each interruption of any of the plurality of beams; and automatically monitoring ambulatory animal activity by separately automatically counting and recording only the first interruption of any one of the plurality of beams until such one beam is reactivated by an interruption of another of the plurality of beams.

12. The steps in the method of monitoring the activity and behavior of an animal specimen, which method comprises containing said specimen in an observation area; projecting a plurality of spaced beams of radiation across the observation area such that the beams are interrupted by activity of the specimen; producing analog voltage signals responsive to interruptions of said beams, said signals being proportioned in magnitude to the displacement of the specimen; differentiating said signals below and above a preselected voltage threshold to delineate within said observation area a preselected boundary between non-ambulatory and ambulatory movements of the specimen; utilizing the analog voltage signals having magnitudes above said preselected voltage threshold to identify movements of the specimen that traverse said boundary; and automatically accumulating counts of each of the two types of movement.

13. The steps in the method of observing and recording the activities of an animal test specimen in an observation area, which method comprises producing analog voltage signals proportional in magnitude to the magnitude of the ambulatory displacement of the aminal in the area; producing horizontal activity voltage signals responsive to movements made by the animal in the area; automatically accumulating horizontal activity voltage signals as non-ambulatory; separately accumulating horizontal activity voltage signals as ambulatory displacements; and automatically switching from one of said accumulations to the other responsive to differentiations of said analog voltage signal.

14. The method defined in claim 13 wherein said differentiation is effected by an electronically created boundary that circumscribes the animal specimen and establishes a threshold between its non-ambulatory and ambulatory movements.

15. The method defined in claim 14 that comprises varying the size of said boundary, so as to selectively establish a threshold between said non-ambulatory movements.

16. The method defined in claim 14 that comprises automatically repositioning said electronically created boundary, so as to reestablish circumscription of the animal specimen subsequent to its displacement to a new location in the observation area.

17. The steps in the method of monitoring the activity and behavior of an animal specimen, which method comprises projecting a plurality of spaced beams of radiation across a test specimen observation area to produce uniform field of beams that are interrupted by activity of the specimen; separately sensing interruptions of each of said beams and producing respective voltage signals for each beam in a separate circuit channel; subjecting the voltage signals in each channel to a memory function that detects the occurrence of the first beam interruption and transmits the resulting first signal for accumulation, all repetitions signals being isolated by said memory function; interconnecting the memory functions of each channel whereby each memory function terminates said isolation of all the other memory functions; automatically accumulating said transmitted first voltage signals as ambulatory activity signals; and separately automatically accumulating all voltage signals from all beam interruptions as total activity signals.

18. The method defined in claim 17 wherein the voltage signals in each channel travel along a first slower path and a second faster path; wherein the second faster path feeds a reset input of said memory function; and wherein all of the reset inputs of all of the memory functions are commonly connected.

19. The method defined in claim 17 wherein the voltage signals in each channel travel along a first slower path and a second faster path; wherein the second faster path includes a switch that is actuated responsive to the occurrence of said first beam interruption.

20. The method defined in claim 17 wherein the voltage signals in each channel travel along a first slower path and a second faster path and wherein said total activity signals are accumulated from said first slower path.

* * * * *